United States Patent [19]
Braithwaite, Jr.

[11] 4,443,520
[45] Apr. 17, 1984

[54] FIREPROOF COATING FOR WOOD OF THERMOPLASTIC RESIN, ALUMINA TRIHYDRATE AND GLASS FIBERS

[76] Inventor: Charles H. Braithwaite, Jr., 11232 Tigrina, Whittier, Calif. 90603

[21] Appl. No.: 426,629

[22] Filed: Sep. 29, 1982

[51] Int. Cl.³ .............................................. B32B 3/26
[52] U.S. Cl. .................. 428/438; 427/372.2; 427/393; 427/393.3; 427/397; 427/440; 428/511; 428/514; 428/537; 428/702; 428/541; 428/921
[58] Field of Search ............... 428/921, 438, 511, 514, 428/537, 702, 541; 427/372.2, 393, 393.3, 397, 440

[56] References Cited

U.S. PATENT DOCUMENTS 4,223,066  9/1980  Boyle ................................ 428/541

Primary Examiner—Marion McCamish
Attorney, Agent, or Firm—Fischer, Tachner & Strauss

[57] ABSTRACT

There is disclosed a method of coating combustible material such as wood, plywood, shingles and the like with a flameproofing composition. The method employs a flame coating composition which is a mixture of a thermoplastic, ambient-temperature, film former such as a polyvinyl acrylic acetate latex, and alumina trihydrate and glass fibers. The ambient temperature film former is a conventional latex used for coating compositions and should have the property of softening at or below the dehydration temperature of alumina trihydrate (about 280 degrees F.) and be capable of forming a stable foam at such temperatures. The alumina, which comprises the major portion of the coating composition, dehydrates when subjected to flame temperatures and the water vapor released from the alumina forms a stable foam. Additionally, the alumina and the glass fibers, which are used as a filler in the composition, form a refractory coating when subjected to flame and this coating traps the gases and serves as a refractory heat insulation that protects and isolates the combustible material from exposure to the flame and ignition.

14 Claims, No Drawings

FIREPROOF COATING FOR WOOD OF THERMOPLASTIC RESIN, ALUMINA TRIHYDRATE AND GLASS FIBERS

BACKGROUND OF THE INVENTION

1. Field of Invention

This invention relates to fire proofing of wood substrates and, in particular, to a method of treating wood substrates to impart flame resistance thereto.

2. Brief Statement of the Prior Art

Flameproofing treatments of wood have generally used intumescent compositions such as tri-ammonium phosphate, polyhydric alcohols and nitrogenous materials. Upon exposure to the flame, the ammonium phosphate decomposes, absorbing heat to decrease the temperature of the coated item. Frequently, the gases released from intumescent coatings are toxic.

Halogenated polymers have also been used as flameproofing agents and are applied by pressure impregnation, a costly method. Bromine and chlorine are most commonly used in epoxy polymers, polyesters and vinyl polymers. Additionally, inorganic materials such as zinc borate and antimony oxides are added to decrease the flammability of the coatings. As with intumescent coatings, these halogenated polymer coatings also release highly toxic gases. Flame resistance of wood substrates has also been achieved to some degree by pressure impregnation of wood with silicates, phosphates and borates. The flame resistance achieved with these treatments is not entirely permanent as the materials are lost from the substrate upon weathering, and this loss is particularly acute with topically applied coatings which lack the limited degree of permanency of impregnated coatings. Additionally, toxicity of the decomposition products can be a problem with these flame retardants also.

Alumina trihydrate is an ideal material for achieving flame retardants since it releases water vapor when heated above about 280 degrees F. This water vapor release absorbs heat from the advancing flame and protects the substrate. Heretofore, however, there has been no coating developed which traps the water vapor released from alumina trihydrate to form a foam which contains water vapor and pyrolysis gases beneath a refractory and thermal insulating barrier over the wood substrate.

BRIEF STATEMENT OF THE INVENTION

This invention comprises a method of coating wood substrates with a flameproofing composition. The flameproofing composition which is used is a mixture of a thermoplastic, ambient temperature film former such as a latex of a thermoplastic polymer, alumina trihydrate and an inorganic fiber reinforcement, preferably glass fiber. The composition is coated on at least one surface of the wood substrate to a film thickness from about 0.01 to about 0.25 inch, sufficient to provide a protective coating. After the application of the coating, the coating is dried at a temperature from ambient to about 280 degrees F., for a time sufficient to remove water therefrom and form a dry coating without effecting any dehydration of the alumina trihydrate. The drying step can be performed by passing the wood products through an oven maintained at a desired elevated temperature or by the application of microwave radiation to the coated product. For this purpose the drying treatment can be at subatmospheric pressure using conventional equipment, e.g., a jet condenser, to process the steam vapor from the drying oven.

The coating is effective to impart flame resistance to the substrate. Dipped coatings, which are on both sides can achieve a Class I fire resistance rating. When the coatings are applied to one side only, e.g., by spraying onto an existing roof a Class II or Class III fire resistance rating can be achieved. These ratings are by ASTM-E108 test. When contacted with a flame, the coating absorbs the heat of the flame, softening the ambient temperature film former (thermoplastic polymer) and releasing water vapor from the alumina trihydrate. The water vapor released from the alumina foams and expands the thermoplastic polymer coating to form a very refractory and heat insulating foam. Further exposure to flame burns out the polymer and plasticizer to form a hard refractory and thermal insulating barrier comprising the alumina and glass fibers. The water vapor is trapped in the foam by the alumina and glass fiber refractory, hard coating on the outer surface of the foam. The underlying wood pyrolyzes and the pyrolysis gases are also trapped beneath the outer surface coating, insuring an oxygen-free atmosphere over the wood, preventing its ignition.

The composition used comprises a mixture of from 20 to about 40 weight percent of a thermoplastic ambient temperature film forming polymer, from 40 to about 80 weight percent of alumina trihydrate, from 2 to about 10 weight percent of an inorganic fiber, preferably glass fibers with minor amounts of other ingredients such as pigments and the like. The vehicle for the solvents of the composition is chiefly water, although other solvents such as propylene glycol can be used together with plasticizers for the polymer such as the alkyl esters of the dicarboxylic aliphatic acids, e.g., dioctylphthalate. The ambient temperature film former comprises a latex such as commercially available latexes of film forming thermoplastic polymers such as polyvinyl acetate, polyacrylates and styrene-butadiene polymers, and halogenated derivatives such as, polyvinylidene chloride, polyvinyl chloride, etc. The composition comprises a suspension of the aforementioned solids and is prepared by admixture of water, alumina, and glass fibers to a commercial latex of the ambient-temperature film former to provide a suspension having a solids content from about 40 to 65 percent, preferably from 45 to 55 percent.

The flameproofing suspension of the invention is applied as a coating to a wood substrate by dipping, rolling, brushing, or spraying. As necessary, suitable thickening agents and gums such as cellulose derivatives can be added to the suspension to achieve a desired viscosity that permits the application of suitably thick coatings in a single application. The coatings are applied in one or more applications to provide a coating thickness from 0.020 to 0.100 inch, preferably from 0.030 to 0.050 inch. The desired thickness can be achieved in a single pass application, even when spraying by adjustment of the viscosity of the suspension.

DESCRIPTION OF PREFERRED EMBODIMENTS

The invention comprises the coating of a wood substrate with a flame retardant composition, and drying of the coating to form a non-tacky film on the surface thereof. The flameproofing composition is an aqueous suspension of solid flameproofing ingredients. The major components of the flameproofing composition are set forth in the following table:

TABLE 1

|  | BROAD | PREFERRED |
|---|---|---|
| Gum | 0.5 | 0.5–2 |
| Thermoplastic film former | 20–40 | 25–35 |
| Alumina trihydrate | 40–80 | 60–70 |
| Mineral fibers | 2–10 | 3–5 |
| Pigments | 0–2 | 0–1 |
| Plasticizer | 4–10 | 5–7 |

The gum used in the solid composition is a cellulosic derivative such as carboxymethylcellulose or hydroxyethylcellulose and is used in a sufficient concentration to permit the desired coating thicknesses of 0.020 to 0.100 inch to be achieved using a single pass application by dipping, brushing, rolling or spraying. The actual concentration of gum used can be determined for the selected application method by simple trial testing, adding the gum at incrementally increasing concentrations until test applications achieve the desired coating thickness without run-off. Generally, concentrations sufficient to raise the viscosity of the suspension of solids to a value from about 5,000 to about 20,000 centipoise seconds, preferably to a value from about 7,500 to about 12,000 centipoise seconds, are used. The method of the application preferably uses a single coating, however, two or more coating applications can be used as needed.

The thermoplastic film former used in the invention is a conventional latex of a thermoplastic polymer such as used in various coating and adhesive compositions. The latexes are commonly available at concentrations of from about 40 to about 65 weight percent solids, usually about 50 weight percent solids. The polymers which form suitable film formers include the polyvinyl esters, polyacrylates and styrene-butadiene copolymers and halogenated derivatives thereof.

The vinyl ester polymers are commonly interpolymerized with polymerizable comonomers including film forming temperature regulators such as unsaturated nitriles, alkyl acrylates or methacrylates. Commonly, the matrix monomer of the vinyl ester interpolymer is a vinyl ester, usually vinyl acetate, although other esters such as vinyl butyrate, vinyl propionate, etc., can also be used. Vinyl ester polymers generally form films at temperatures slightly in excess of common ambient temperatures. The vinyl esters such as vinyl acetate can be copolymerized with ethylene or with other film forming, temperature regulating comonomers such as ethyl acrylate, methyl acrylate, isopropyl acrylate, 2-ethylhexyl acrylate, acrylonitrile, etc. These additional monomers can be used at concentrations from about 1 to about 20 weight percent of the vinyl ester.

Another suitable class of latexes are the styrene butadiene polymers and copolymers which can contain other comonomers such as the aforementioned acrylates and acrylonitrile.

Preferably a plasticizer is used with the polymer in the aforementioned quantities to increase the resilience and flexibility of the polymer film. The selection of a plasticizer depends on the film forming polymer since the plasticizer should be compatible with the film forming polymer. Examples of suitable plasticizers are dialkyl azelates; glycol dibenzoates; epoxidized soybean oil or tall oil; triaryl, trialkyl and alkaryl phosphate esters such as dioctyl orthophosphate, dialkyl phthalates, polyesters of dibasic acids such as adipic or phthalic with glycols, etc. Of these, the phosphate esters are preferred for enhancement of flame retardancy, such as dioctyl phosphate, isodecyl diphenyl phosphate, etc.

The latexes of the thermoplastic film former are commonly prepared by emulsion copolymerization in the presence of a suitable emulsifying agent that stabilizes the emulsion and the polymerization is conducted sufficiently to produce a latex containing from about 35 to 65 weight percent solids. These latexes are commonly available, however, many of the commercially available latexes contain cross linking agents which are typically non-conjugated, polyethylenically unsaturated monomers such as vinyl acrylate, divinyloxylate, vinyl fumarate, MN-dibutenyl melamine, etc. It is preferred to maintain thermoplasticity of the film former and, accordingly, the latexes useful in the invention should be substantially free of these various cross linking agents.

The source of vapor or gases for the foaming of the film former at its melt temperature is alumina trihydrate. Other inorganic additives besides alumina trihydrate which can be used in minor quantities include gypsum and calcium carbonate. Of these, alumina trihydrate is preferred, and in any instance, constitutes the major component of the inorganic vapor releasing ingredient. If desired, however, up to about 10 percent of the alumina trihydrate can be substituted with gypsum or with calcium carbonate.

The mineral fibers which are used in the invention are chopped or short fibers from about 0.1 to about 0.5 inch, preferably from about 0.1 to about 0.2 inch. The preferred fibers are glass fibers, however, mineral wool fibers or asbestos fibers can also be used if desired. It has been found that the glass fibers are substantially more effective than are the other fibers and the glass fibers are thus preferred for this application.

The pigments which can be included in the composition include the various compounds, salts and oxides of metals such as iron, cobalt, chromium, titanium, tin, antimony, etc. Typical of these are iron oxide, copper oxide, copper sulfate, titanium dioxide, etc. The pigments are used to obtain the desired color of the coating composition.

The wood substrates are coated by spraying or dipping the substrates with the suspension. In one method, the substrates such as shingles can be dipped into a vessel containing a suspension of the flameproofing ingredients, withdrawn and dried, preferably at an elevated temperature to hasten the drying process. Dipping the wood product such as shingles is preferred since it achieves a coating on both sides and thus achieves an ASTM Class I rating in a single treatment. Existing roofs and structures can, of course, be sprayed or coated by brushing. The coating composition dries to a non-tacky surface in approximately 4 hours at ambient temperatures and the heating of the coating composition prior to coating of the wood substrate and/or the heating of the coated substrate hastens this drying process.

Preferably the substrate is coated at an elevated temperature, typically at a temperature about 150 to about 200 degrees F. and is thereafter maintained at an elevated temperature in an oven where it is contacted with air heated to a temperature of about 250–280 degrees F. For this purpose, the bath of coating suspension can be maintained at a temperature from 125 to about 200 degrees F. Suitable indirect heating equipment such as a jacketed vessel or steam coils can be used to maintain the suspension at this temperature. At the elevated temperature, the coated substrate dries to a non-tacky surface in approximately 5 to 15 minutes and can thereafter be packaged, handled and stored in a manner similar to that used for the uncoated wood substrates. During the drying step, the coating composition is not heated to 280 degrees or greater to avoid any decomposition of the alumina trihydrate.

An alternative method for heating of the coating substrate is to pass the coated substrate through a microwave oven cavity where the substrate is exposed to microwave radiation. Commercial microwave ovens can be used for this application. This treatment is effective in drying of the coating since the radiation couples to the free water in the coating but not to the water of hydration of the alumina, thereby heating the free water and evaporating this water from the coating without dehydration of the alumina trihydrate.

EXAMPLE

In the following example, a coating composition is prepared from the following ingredients:

TABLE 2

|  | PARTS BY WEIGHT |
| --- | --- |
| Cellusize (methyl cellulose) | 16 |
| Dioctyl phosphate | 94 |
| Propylene glycol | 94 |
| Polyvinyl acetate latex (50% solids) | 900 |
| Alumina trihydrate | 800 |
| Glass fibers (¼inch) | 54 |
| Pigments | 0.8 |
| Water | 850 |

The coating composition is prepared by mixing water, propylene glycol and the methyl cellulose while stirring until a gel forms. Then, to the gel is added 277.5 gallons of vinyl acetate latex, the alumina trihydrate, glass fibers and pigments, and dioctyl phosphate. Water is added as necessary to maintain the suspension at the desired solids content of approximately 50 weight percent and is added, as necessary to trim the viscosity to a value permitting a single pass application of about 0.030 inch without run off.

The coating composition is then applied to wood substrates, typically to the surface of plywood at a coating thickness of 0.025 inch. The coating composition is preheated prior to its application to a temperature of 185 degrees F. and the coating is sprayed onto the plywood surface. The plywood is then placed in an oven and maintained in the oven at a temperature of 220 degrees F. for a period of 10 minutes and is thereafter removed and the coating is inspected to reveal that it is a non-tacky coating suitable for subsequent handling and storage.

The plywood coated in accordance with the invention is subjected to a tunnel flame test in which the plywood panel is supported at a 45 degree angle with the coated surface facing upwardly. A burner is then adjusted to provide a flame approximately 1 inch long and this flame is directed against the lower edge and adjacent top surface of the plywood panel. The flame is maintained in contact with the wood panel for varied periods of time. After 1 minute the flame is removed and it is observed that there is no flame spread. The flame is then applied to the panel for intervals of 2 minutes, 5 minutes and 10 minutes. After each application the flame is removed and no flame spread is observed on the plywood. The coating evidences charring and foaming in the presence of the heated area in contact with the flame and the outer surface of the foam which is formed on the plywood is observed to have a very hard refractory surface which separates from the underlying plywood surface.

The coating can be similarly applied to wood shingles and samples of the wood shingles so coated are subjected to a similar flame test. In the flame test, a coated shingle is placed at an angle approximately 80 degrees to the vertical with the coated side facing downwardly and a gas burner with a flame adjusted to approximately a 1.5 inch cone, is placed beneath the shingle with the flame cone impinging directly against the coated shingle. The flame spreads slightly about the surface of the coating for approximately 5 minutes of exposure and thereafter does not spread any further. The surface impinged by the flame glows dull red, indicating a temperature at the coating surface of approximately 700 degrees F. or greater. The coated shingle however, does not ignite even with prolonged exposure, up to 30 minutes, to the flame. After exposure the shingle is inspected and found to exhibit some charring and cracking but the coating which has been converted to a very refractory foam over the surface of the wood shingle prevents ignition of the wood shingle.

The invention has been described with reference to the illustrated and presently preferred embodiments. It is not intended that the invention be unduly restricted by the illustrated and presently preferred embodiments. Instead, it is intended that the invention be defined by the steps, and their obvious equivalents, set forth in the following claims.

What is claimed is:

1. The method of treating a wood product which comprises:
   (a) coating at least one surface of said wood product with a suspension of:
      (i) ambient temperature film former ingredients selected from the class of latexes of polyvinyl acetate, polyacrylates, styrene-butadiene polymers and halogenated derivatives thereof, and copolymers thereof, and
      (ii) high temperature barrier forming ingredients including from 26 to 30 weight percent of alumina trihydrate, and from 2 to 10 weight percent of glass fibers;
   (b) drying said coating at a temperature from ambient to about 275 degrees F. for a time sufficient to remove water therefrom and form a dry coating without dehydration of said alumina trihydrate.

2. The method of claim 1 wherein said suspension is applied at a sufficient dosage to provide a coating with a thickness from 0.02 to 0.100 inch on each face.

3. The method of claim 2 wherein said wood product is dipped into said suspension.

4. The method of claim 2 wherein said suspension is sprayed onto a surface of said wood product.

5. The method of claim 1 wherein said coating is dried by placing said wood product in an oven maintained at a temperature from 250 to about 280 degrees F.

6. The method of claim 1 wherein said coating is dried by the application of microwave radiation thereto.

7. The method of claim 1 wherein said latex is polyvinyl acetate.

8. The method of claim 7 wherein said latex also includes from 3.0 to 5.0 weight percent of a plasticizer.

9. The method of claim 1 wherein said latex is polyvinylidene chloride.

10. The method of claim 1 wherein said glass fibers are present in an amount from 3 to 5 weight percent.

11. A wood product comprising:
(a) a wood sheet product having, on both of its opposite, major surfaces, a coating with a thickness from 0.020 to 0.100 inch and comprising:
(b) a dried film of a thermoplastic polymer selected from the class of non-cross-linked polyvinyl acetate, polyacrylates, styrene-butadiene polymers, and halogenated derivatives thereof, and as a filler therefore, from 40 to 80 weight percent alumina trihydrate and from 2 to about 10 weight percent glass fibers having lengths from 0.1 to about 0.5 inch.

12. The product of claim 11 wherein said latex is polyvinyl acetate.

13. The product of claim 11 wherein said latex is polyvinylidene chloride.

14. The product of claim 11 wherein said latex also includes from 5.0 to 10.0 weight percent of a plasticizer.

* * * * *